(12) United States Patent
Ide

(10) Patent No.: US 12,270,150 B2
(45) Date of Patent: Apr. 8, 2025

(54) METHOD FOR RECOVERING FIBER FROM SCREENING REJECT AND FINE SORTING PRE-PROCESSING DEVICE FOR USE IN METHOD FOR RECOVERING FIBER

(71) Applicant: TAIZEN CO., LTD., Fuji (JP)

(72) Inventor: Takefumi Ide, Fuji (JP)

(73) Assignee: TAIZEN CO., LTD., Fuji (JP)

( * ) Notice: Subject to any disclaimer, the term of this patent is extended or adjusted under 35 U.S.C. 154(b) by 173 days.

(21) Appl. No.: 17/626,595

(22) PCT Filed: Apr. 20, 2020

(86) PCT No.: PCT/JP2020/017003
§ 371 (c)(1),
(2) Date: Jan. 12, 2022

(87) PCT Pub. No.: WO2021/009988
PCT Pub. Date: Jan. 21, 2021

(65) Prior Publication Data
US 2022/0243394 A1    Aug. 4, 2022

(30) Foreign Application Priority Data

Jul. 16, 2019 (JP) .................................. 2019-131348

(51) Int. Cl.
*D21B 1/32* (2006.01)
*D21C 5/02* (2006.01)
(Continued)

(52) U.S. Cl.
CPC ................. *D21B 1/32* (2013.01); *D21C 5/02* (2013.01); *D21D 5/02* (2013.01); *D21B 1/345* (2013.01)

(58) Field of Classification Search
CPC . D21B 1/32; D21B 1/345; D21C 5/02; D21D 5/02
See application file for complete search history.

(56) References Cited

U.S. PATENT DOCUMENTS

| 5,316,621 A | 5/1994 | Kitao et al. |
| 5,996,806 A * | 12/1999 | Vikio ........................ D21C 5/02 |
| | | 209/10 |
| 6,053,439 A * | 4/2000 | Locke .................... D21D 5/026 |
| | | 241/24.19 |

FOREIGN PATENT DOCUMENTS

| JP | 665882 A | 3/1994 |
| JP | 10212680 A | 8/1998 |

(Continued)

OTHER PUBLICATIONS

WO2021009988A1 Published Application with International Search Report, mailed Jun. 23, 2020, in counterpart PCT application PCT/JP2020/017003, 21 pages in Japanese.

*Primary Examiner* — Jacob T Minskey
*Assistant Examiner* — Stephen M Russell
(74) *Attorney, Agent, or Firm* — Juan Carlos A. Marquez; Marquez IP Law Office, PLLC

(57) ABSTRACT

Waste paper contains sticky foreign material, and the recovery and sending of this sticky foreign material to a paper-making process together with fiber is liable to lead not only to the sticky foreign material sticking to and contaminating the paper making machine or dryer but also paper peeling and tearing, causing a decline in paper quality. This method for recovering fiber form a screening reject is characterized by comprising the steps of: sending a screening reject coming out from a coarse sorting process to a fine sorting pre-processing process such that the screening reject is impacted against rotating blades 8 or stationary blades 11 in the interior of a cylinder body 2 and detachment of the fibers from the sticky foreign material by the sticky foreign material being kneaded and granulation and balling-up of the detached sticky foreign material are promoted, taking advantage of the sticky foreign material becoming extendable and shrinkable due to softening in an environment in (Continued)

which heat is generated from friction between fibers; and then sending the result to the fine sorting process so that the fiber is recovered with the balled-up sticky foreign material being separated as a screening reject via the fine sorting process.

5 Claims, 4 Drawing Sheets

(51) Int. Cl.
*D21D 5/02* (2006.01)
*D21B 1/34* (2006.01)

(56) References Cited

FOREIGN PATENT DOCUMENTS

| | | | |
|---|---|---|---|
| JP | 2002004186 A | * | 1/2002 |
| JP | 2002309493 A | * | 10/2002 |
| JP | 2006183210 A | | 7/2006 |
| JP | 2008121163 A | | 5/2008 |
| WO | 9207137 A1 | | 4/1992 |

* cited by examiner

After pre-processing

Before fine sorting pre-processing

METHOD FOR RECOVERING FIBER FROM SCREENING REJECT AND FINE SORTING PRE-PROCESSING DEVICE FOR USE IN METHOD FOR RECOVERING FIBER

The present application is a National Stage application of PCT Application No. PCT/JP/2020/017003 filed on Apr. 20, 2020, which claims priority to Japanese Application No. 2019-131348 filed on Jul. 16, 2019, the disclosures of which are hereby incorporated by reference in their entireties.

TECHNICAL FIELD

The present invention relates to a method for recovering fiber from screening reject, which makes it possible to recover additional fiber from screening reject that has been gained in a coarse sorting process when fiber is recovered from waste paper, and a fine sorting pre-processing device for use in the method for recovering fiber.

BACKGROUND ART

In order to recover fiber from waste paper, a disaggregation process for disaggregating waste paper with a pulper or the like, a coarse sorting process for removing foreign material from fiber slurry gained in the disaggregation process with a screen and a fine sorting process for removing smaller foreign material again with a screen are adopted as the main processes, and an appropriate screen is used respectively for the coarse sorting process and the fine sorting process.

Waste paper contains an adhesive that was used in the respective stages of printing on paper, processing, and packaging, as well as a binder that was mixed in the paper. When the screens fail to remove these sticky foreign materials, which are thus collected together with fiber and fed into a papermaking process, there is a risk that the materials could not only adhere to the papermaking machine or the dryer as stain, but also cause peeling or tearing of the paper, which lowers the quality of paper.

Therefore, the size of the slits of the screen is set to a smaller one from the stage of the coarse sorting process in order to remove the sticky foreign material as screening reject. Thus, the screening reject is discarded.

In the screening reject, however, fiber adheres to the sticky foreign material, and as a result, the fiber is also discarded together with the screening reject, which makes the yield of recovered fiber poor.

CITATION LIST

Patent Literature

Patent Literature 1: Japanese Unexamined Patent Publication H10 (1998)-212680

SUMMARY OF THE INVENTION

Technical Problem

In order to address the problem, it has been proposed to feed the sticky foreign material into the fine sorting process after being finely shredded by using a disaggregating machine as described in Patent Literature 1.

According to this proposal, the fine re-shredded sticky foreign material can prevent the papermaking machine from being stained as described above, and thus can prevent the lowering of the paper quality while increasing the yield of the recovered fiber. Contrary to this expectation, the quality of fiber is lowered due to the cutting effects of such a disaggregating machine, which damages or cuts the fiber. In addition, the sticky foreign material that has been finely shredded once aggregates again due to the heat of the dryer and becomes tangible.

It is also proposed to recover the screening reject that is gained in the coarse sorting process and return the collected screening reject to the pulper in the disaggregation process. Even when such treatment with the pulper is repeated, however, the yield of the recovered fiber does not change much.

The present invention is made by focusing on the above-described problem with the prior art, and an object thereof is to provide a novel and useful method for recovering fiber from screening reject which makes it possible to separate fiber well from the sticky foreign material without damaging the fiber by focusing on the screening reject gained in the coarse sorting process, and a fine sorting pre-processing device for use in the method for recovering fiber.

Solution to Problem

The present invention is provided in order to solve the above-described problem, and the invention according to the first aspect is a method for recovering fiber from screening reject in recycling of waste paper, characterized by: feeding screening reject that has been gained in a coarse sorting process using the fine sorting pre-processing device into a fine sorting pre-processing process, wherein such an environment that heat of 90° C. or higher is generated through friction between fibers and sticky foreign material is softened and becomes expandable and contractable is utilized in order to progress the detachment of sticky foreign material from fibers and the granulation and balling up of the detached sticky foreign material by kneading the sticky foreign material; and after that, discharging the resulting material from the fine sorting pre-processing device, and in the discharged state, feeding the resulting material into a fine sorting process, wherein the balled-up sticky foreign material is separated as screening reject, and then, fiber is recovered.

The invention according to the second aspect is the method for recovering fiber from screening reject according to the first aspect, characterized in that the relative amount of sticky foreign material is increased through condensation before the sticky foreign material is fed into the fine sorting pre-processing process in the case where the concentration of the screening reject that has been gained in the coarse sorting process is less than 25%.

The invention according to the third aspect is the method for recovering fiber from screening reject according to the first or the second aspect, characterized in that the same process as that in the fine sorting process for the screening fines that have been gained in the coarse sorting process is used for the screening reject that has been gained in the coarse sorting process after the screening reject has been fed into the fine sorting pre-processing process.

The invention according to the fourth aspect is the method for recovering fiber from screening reject according to any of the first through third aspects, using the fine sorting pre-processing device provided with: a cylinder body of which the direction of the axis is horizontal; a rotating shaft that is provided within the cylinder body in the direction of the axis so as to be rotatable around the axis; a group of rotating blades attached to the rotating shaft; and a group of stationary blades provided so as to protrude from the inner surface of the cylinder body towards the axis, and characterized in that the rotating blades in the group of rotating blades are diagonal relative to the rotating shaft as viewed in the direction of the axis, and the group includes feeding blades and retrieving blades of which the phases shift from each other in such a manner that the planes of the blades cross each other, the stationary blades in the group of stationary blades are located in one space between adjacent rotating blades after another as viewed in the direction that is perpendicular to the direction of the axis as the rotating blades rotate, and a successive change in the positional relationship between the rotating blades and between the rotating blades and the stationary blades due to the rotation of the group of rotating blades progresses the detachment of the sticky foreign material from the fibers that are included in the screening reject hit by the blades and the granulation and the balling up of the detached sticky foreign material by kneading the detached sticky foreign material.

The invention according to the fifth aspect is the method for recovering fiber from screening reject according to the fourth aspect, characterized in that, in the fine sorting pre-processing device, both the rotating blades and the stationary blades are formed of quadrilateral plate-like bodies.

The invention according to the sixth aspect is the method for recovering fiber from screening reject according to the fourth or the fifth aspect, characterized in that, in the fine sorting pre-processing device, the rotating blades of the group of rotating blades are attached so as to be exchangeable, and the arrangement of the feeding blades and the retrieving blades can be changed.

The invention according to the seventh aspect is the method for recovering fiber from screening reject according to fifth or sixth aspects, characterized in that, in the fine sorting pre-processing device, the rotating blades of the group of rotating blades are diagonal relative to the rotating shaft as viewed in the direction of the axis, and the group includes feeding blades and retrieving blades of which the phases shift by 180° so that the planes of the blades cross each other.

Advantageous Effects of the Invention

According to the present invention, fiber can be collected from screening reject gained in a coarse sorting process without damaging the fiber and with a high yield.

DESCRIPTION OF EMBODIMENTS

An embodiment of the present invention is described in reference to the drawings.

In order to recover fiber from waste paper, a disaggregation process for disaggregating waste paper with a pulper or the like, a coarse sorting process for removing foreign material from fiber slurry gained in the disaggregation process with a screen, and a fine sorting process for removing smaller foreign material again with a screen are adopted as the main processes. In the present invention, the screening reject gained in this coarse sorting process is targeted to be processed.

Figure 1:
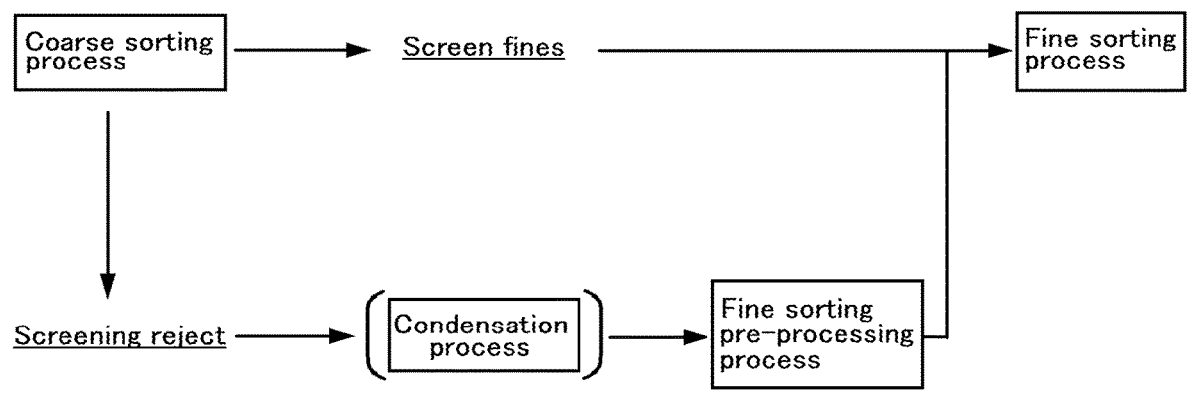
FIG. 1 is a diagram showing the processes in the method for recovering fiber from screening reject according to an embodiment of the present invention.

The screening reject contains as sticky foreign material an adhesive that is used in the stages of printing on paper, processing, and packaging, and a binder that is mixed in the paper, and single fibers, a bundle of fibers, or tangled fibers stick to or are mixed in the sticky foreign material. The screening reject is fed into the processes shown in FIG. 1 so as to be treated.

It is preferable for the concentration of the screening reject to have been increased to approximately 25%. When the concentration is high, the sticky foreign material is aggregated to an appropriate size, and thus, it becomes easy to expand or contract.

In some cases, the concentration of the screening reject is high depending on the screen, and in other cases, the screening reject is enriched in a concentration process.

In this concentration process, it is preferable to use a spin dryer with a drying drum. When the screening reject is concentrated through the drying effects, the fiber is not damaged or torn.

After that, the screening reject is fed into a fine sorting pre-processing process. The fine sorting pre-processing device 1 to be used in this fine sorting pre-processing process is described below in detail.

After that, the screening reject is fed into a fine sorting process. The screen that is appropriate for use in the fine sorting process has 10 to 6 cuts and a slit width in a range from 0.25 mm to 0.15 mm, and thus, it is recommended to adjust the screen in that range.

This screen is as fine as a fine sorting screen that is used for the final fine sorting process to which the screening reject that is gained as screening fines after passing through the screen in the coarse sorting process.

Figure 2:
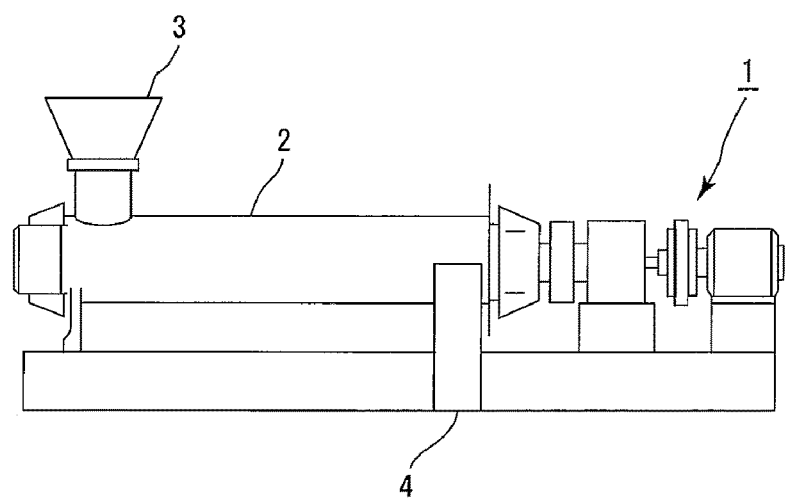
FIG. 2 is a side diagram showing the fine sorting pre-processing device used in FIG. 1.
Figure 3:
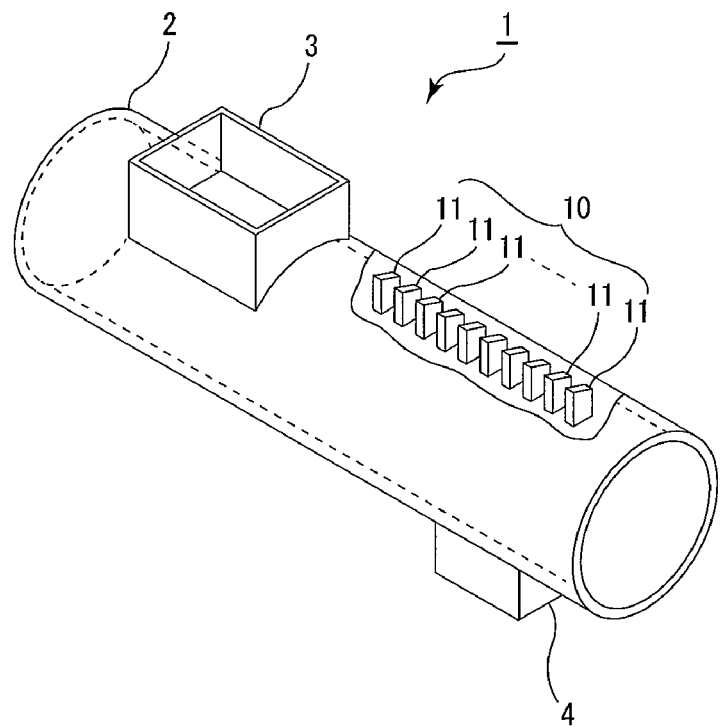
FIG. 3 is a perspective diagram showing stationary blades fixed to the side of the cylinder body that is the outer shape of the device in FIG. 2.

As shown in FIGS. 2 and 3, a fine sorting pre-processing device 1 is provided with a cylinder body 2 being in the state where the direction of the axis is horizontal. An opening for input 3 is provided in the upper portion of one end along the direction of the axis of this cylinder body 2 so that a hopper is formed, and an opening for discharge 4 is provided in the lower portion of the other end. The opening for discharge 4 is provided in such a manner that the internal pressure is adjustable or can be increased through the dumper control by means of an air cylinder.

Figure 4:
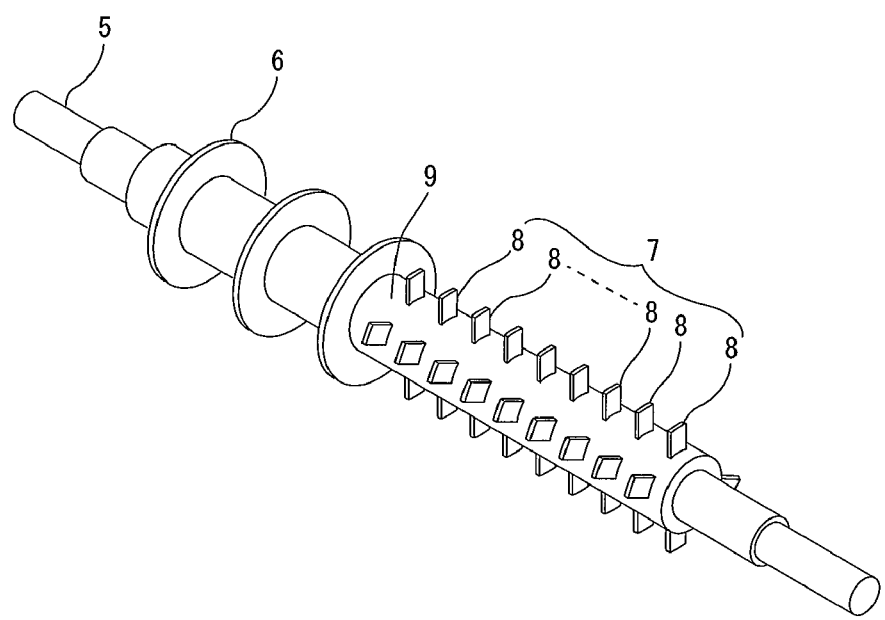
FIG. 4 is a perspective diagram showing rotating blades that are arranged inside the device in FIG. 2.

As shown in FIG. 4, a rotating shaft 5 passes through the inside of the cylinder body 2 in the direction of the rotating axis in such a manner that the rotating shaft 5 can be driven by a motor (not shown) so as to be rotatable around the axis.

Figure 5:
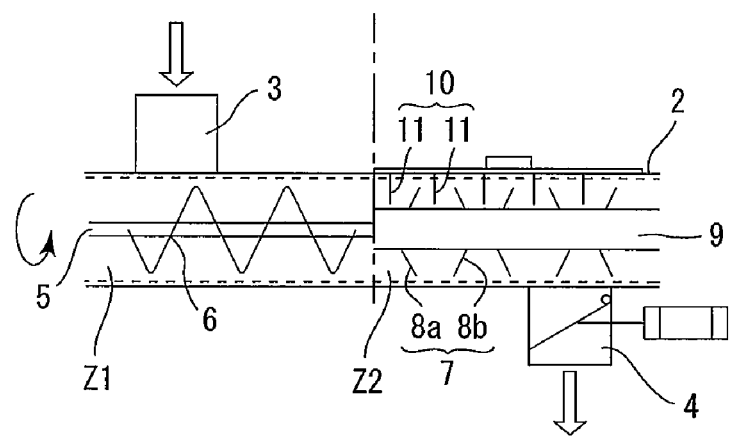
FIG. 5 is a schematic diagram showing the configuration of the device in FIG. 2 as viewed from the direction of the axis.

The inside of the cylinder body 2 has different configurations between the opening for input 3 side and the opening for discharge 4 side, and as shown in FIG. 5, a conveyance zone Z1 is provided on the opening for input 3 side. In the conveyance zone Z1, screw blades 6 are attached to the rotating shaft 5 in a spiral form in such a manner that the screening reject that has been cast in through the opening for input 3 is conveyed toward the opening for discharge 4 side as the screw blades 6 turn on the rotating shaft 5 that rotates. A detachment/granulation zone Z2 that is tightly closed is provided on the opening for discharge 4 side, and screening reject is pushed into the zone Z2, which is thus filled in.

In the detachment/granulation zone Z2, a group of rotating blades 7 is attached to the rotating shaft 5.

As shown in FIG. 4, the rotating blades 8 in the group of rotating blades 7 are formed of plate-like rectangular bodies, and one short side of each body is fixed to a block 9.

The block 9 is attached to the rotating shaft 5 so as to be removable. As viewed in the direction that is perpendicular to the axis of the rotating shaft 5, the block 9 engages with the rotating shaft 5 in such a manner as to cover the rotating shaft 5 from the outside, in which state four rotating blades 8, 8, . . . can be seen as to spread towards the outside in the direction of the diameter in a radial manner.

In addition, the rotating blades 8, 8, . . . are attached so as to be aligned in series in the direction of the axis, and four lines of the rotating blades 8, 8, . . . are provided on the outer peripheral surface of the rotating shaft 5 along the direction of the axis.

The plate surface of a rotating blade 8 is diagonal relative to the rotating shaft 5 at an appropriate angle as viewed from the direction of the axis. Here, the rotating blades 8 are categorized into two types, where rotating blades 8a and rotating blades 8b are in such a relationship that the phases are shifted by 180° from each other. Accordingly, the respective plate surfaces of the rotating blades 8a and the rotating blades 8b, which are both attached to the rotating shaft 5, are in such a relationship as to cross through the planes that are extended from the respective plane surfaces. The rotating blades 8a and the rotating blades 8b shown in FIG. 5 are deformed for easy understanding in such a manner as to incline greater than in reality.

The plate surfaces of the rotating blades 8a are inclined so that the screening reject that has been pushed from the conveyance zone Z1 is fed towards the opening for discharge 4 side, and thus, the rotating blades 8a work as feeder blades. Meanwhile, the plate surfaces of the rotating blades 8b are inclined so that the screening reject that has been pushed from the conveyance zone Z1 is returned toward the conveyance zone Z1 side, and thus, the rotating blades 8b work as retrieval blades.

As described above, the rotating blades 8 are attached to the rotating shaft 5 via the block 9, where the combination and arrangement of the rotating blades 8a and the rotating blades 8b are free.

In this embodiment, the rotating blades 8a and the rotating blades 8b are aligned along the direction of the axis so as to alternate.

Stationary blades 11 in a group of stationary blades 10 are also formed of plate-like rectangular bodies. One short side of each body is fixed to the inner surface of the cylinder body 2 in such a manner that the stationary blades 11 are provided so as to protrude toward the inside in the direction of the radius. In addition, the plate surfaces of the stationary blades 11 face in the direction of the axis.

The stationary blades 11 are fixed to two locations that are 90° away from each other as viewed along the direction that is perpendicular to the direction of the axis of the cylinder body 2. In addition, the stationary blades 11, 11, . . . are attached so as to be aligned in series in the direction of the axis, and two lines of the stationary blades 11, 11, . . . are provided on the inner surface of the cylinder body 2 along the direction of the axis.

As shown in FIG. 5, a rotating blade 8 rotates between adjacent stationary blades 11 and 11 as viewed in the direction of the axis, and the stationary blades 11 do not interfere with the rotation of the rotating blades 8.

Figure 6:
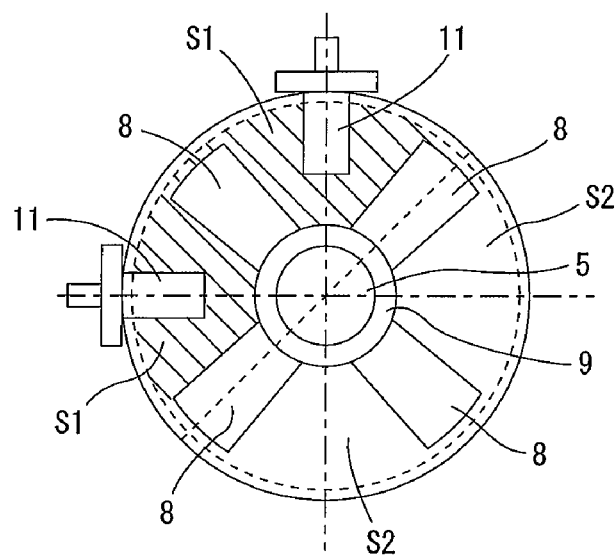
FIG. 6 is a schematic diagram showing the configuration of the device in FIG. 2 as viewed from the direction that is perpendicular to the direction of the axis.

As shown in FIG. 6, four spaces S in total are provided between adjacent rotating blades 8, 8 as viewed in the direction that is perpendicular to the direction of the axis of the cylinder body 2, and a stationary blade 11 is located in the two spaces S, S from among the four. In the state where a stationary blade 11 is located in a space S, the space S is narrower by the size of the stationary blade 11. That is to say, two spaces S1 from among the four are narrow, and the remaining two spaces S2 are wide.

As the rotating blades 8, 8, . . . rotate, the spaces S in which a stationary blade 11 is located shift. The stationary blades 11 and 11 are attached with a gap of 90°, and therefore, one space S changes from a wide space S2 to a wide space S2 to a narrow space S1 to a narrow space S1 to a wide space S2 . . . .

The detachment/granulation zone Z2 is formed as described above, and screening reject is pushed into the detachment/granulation zone Z2, which is thus filled in. As viewed in the direction of the axis, the screening reject is greatly moved in the direction of the axis while rotating. That is to say, the screening reject is fed in the feeding direction while rotating by means of the rotating blades 8a, and retrieved in the retrieving direction while rotating by means of the rotating blades 8b.

In addition, the screening reject receives force in the direction of being compressed in a narrow space S1 as viewed in the direction that is perpendicular to the axis, whereas the force is relieved in a wide space S2.

In this manner, the screening reject is moved three-dimensionally in a complex and dynamic manner.

The screening reject is characterized by the state where needlelike hard fibers are entangled in the sticky foreign material that is softened by heat, and therefore, when the material is moved as described above, the fibers cross each other, which emits heat through friction. As a result of this emission of heat, the temperature becomes close to 90° C. or higher than that in some cases, and thus, the sticky foreign material receives heat so as to be softened and is kneaded in this state so as to be expanded and contracted. At this time, hard fibers are naturally detached from the soft, sticky foreign material. The rotating blades 8 and the stationary blades 11 do not have an edge portion that acts to cut the fibers, and in addition, the spaces S between the blades are set to a size that is sufficiently large as compared to the length of the fibers, which prevents the fibers from being damaged or cut. Then, the sticky foreign material from which the fibers have been detached is granulated and balled up.

Figure 7:
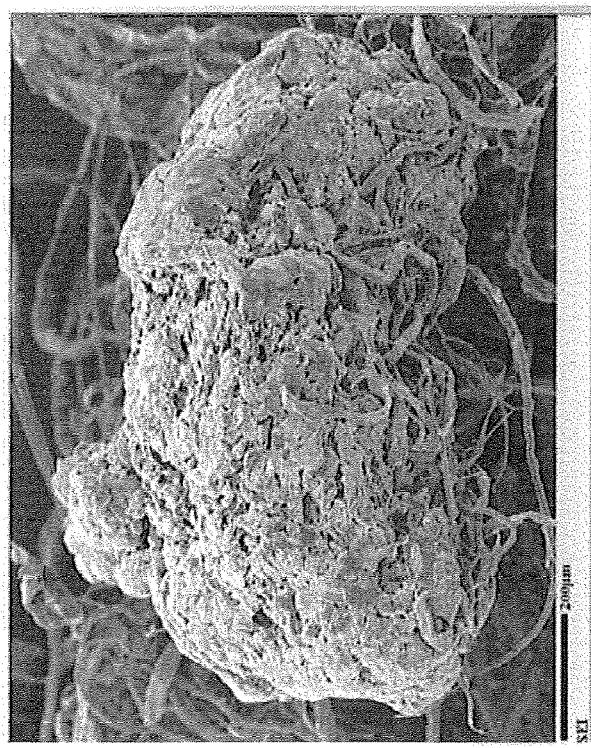
FIG. 7 shows photographs for comparison of sticky foreign material before and after the granulation and balling up.
Figure 7:
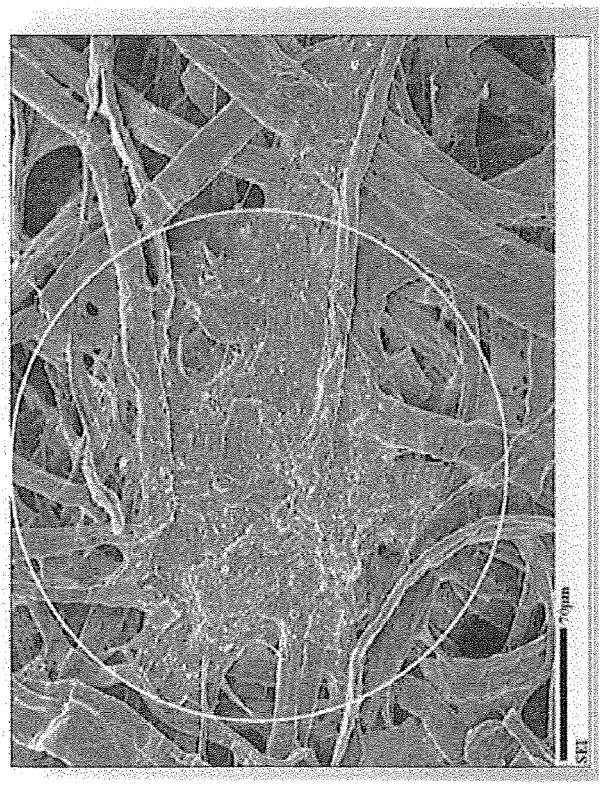

FIG. 7 shows photographs of the screening reject before being pre-processed in the fine sorting pre-processing device 1 and after the pre-processing, from which it can be confirmed that the sticky foreign material has actually been balled up.

When the opening for discharge 4 is opened after the pre-processing and screening reject is discharged therefrom, the sticky foreign material that has been balled up is cooled so as to maintain its shape, and at the same time makes it difficult for the fibers to pierce through.

Accordingly, the sticky foreign material that has been granulated and balled up stays on the screen as screening reject when being fed into the fine sorting process in the state after being discharged from the fine sorting pre-processing device 1, and the needlelike fibers pass through the screen as screening fines.

As described above, fibers can be collected not only from the screening fines that have been gained in the coarse sorting process, but also from the screening reject, and thus, the yield of the fiber collection can be significantly increased. In addition, the fine sorting pre-processing device 1 works rather better in the separation between the fibers and the sticky foreign material in the case where a greater amount of sticky foreign material is included, and therefore, the size of the slits of the screen can be set smaller in order to prevent the sticky foreign material from being mixed into the screening fines in the coarse sorting process.

Accordingly, the process of treating screening reject by using the fine sorting pre-processing device 1 can be carried out simultaneously together with the existing process of recovering waste paper so that fibers in good condition, where the sticky foreign material has been removed, can be collected from waste paper with high yield.

This device has a simple structure, which causes few glitches, and thus can be operated continuously for a long period of time. In addition, the operation is possible with power that is smaller as compared to the amount of processing, and as a result, the running costs are low.

The embodiments of the present invention are described above in detail; however, the concrete configuration is not limited to these embodiments, and modifications of the design in the scope where the gist of the present invention is not deviated from are also included in the present invention.

For example, the combination and the arrangement of the rotating blades 8a and the rotating blades 8b are free, and this arrangement can be appropriately set, taking into consideration the amount and the degree of the viscosity of the sticky foreign material that is included in screening reject.

REFERENCE SIGNS LIST

1 . . . Fine sorting pre-processing device
2 . . . Cylinder body
3 . . . Opening for input
4 . . . Opening for discharge
5 . . . Rotating shaft
6 . . . Screw blade
7 . . . Group of rotating blades
8 . . . Rotating blade
8a . . . Feeding blade
8b . . . Retrieving blade
9 . . . Block
10 . . . Group of stationary blades
11 . . . Stationary blade
Z1 . . . Conveyance zone
Z2 . . . Detachment/Granulation zone
S . . . Space
S1 . . . Narrow space
S2 . . . Wide space

The invention claimed is:

1. A method for recovering fiber from screening reject in recycling of waste paper, comprising the steps of:
feeding into a fine sorting pre-processing process a first screening reject that has been gained in a coarse sorting process, using a fine sorting pre-processing device configured to have an environment wherein heat of 90° C. or higher is generated through friction between fibers and sticky foreign material is softened so as to be expandable and contractable in order to progress the detachment of sticky foreign material from fibers and the granulation and balling up of the detached sticky foreign material via kneading of the sticky foreign material;
afterwards, discharging resulting material from the fine sorting pre-processing device, and
after discharging, feeding the resulting material from the fine sorting pre-processing device into a fine sorting process, wherein the balled-up sticky foreign material is separated as a second screening reject such that fiber is thereafter recovered, the device comprising:
a cylinder body of which a direction of axis is horizontal;
a rotating shaft that is provided within the cylinder body in the direction of the axis so as to be rotatable around the axis; a group of rotating blades attached to the rotating shaft; and a group of stationary blades provided so as to protrude from the inner surface of the cylinder body towards the axis, wherein
rotating blades in the group of rotating blades are diagonal relative to the rotating shaft as viewed in the direction of the axis, and the group includes feeding blades and retrieving blades of which phases shift from each other in such a manner that planes of the blades cross each other,
stationary blades in the group of stationary blades are located in one space between adjacent rotating blades after another as viewed in a direction that is perpendicular to the direction of the axis as the rotating blades rotate,
a successive change in a positional relationship between the rotating blades and between the rotating blades and the stationary blades due to the rotation of the group of rotating blades progresses the detachment of the sticky foreign material from the fibers that are included in the first screening reject hit by the blades and the granulation and the balling up of the detached sticky foreign material by kneading the detached sticky foreign material, and
in the fine sorting pre-processing device, both the rotating blades and the stationary blades are formed of quadrilateral plate-like bodies.

2. The method for recovering fiber from screening reject according to claim 1, wherein a relative amount of the sticky foreign material is increased through condensation before the sticky foreign material is fed into the fine sorting pre-processing process in the case where the concentration of the first screening reject that has been gained in the coarse sorting process is less than 25%.

3. The method for recovering fiber from screening reject according to claim 1, wherein a same process as that in the fine sorting process is used for the first screening reject gained in the coarse sorting process after the first screening reject has been fed into the fine sorting pre-processing process.

4. The method for recovering fiber from screening reject according to claim 1, wherein, in the fine sorting pre-processing device, the rotating blades of the group of rotating blades are attached so as to be exchangeable, and the arrangement of the feeding blades and the retrieving blades is changeable.

5. The method for recovering fiber from screening reject according to claim 1, wherein, in the fine sorting pre-processing device, the rotating blades of the group of rotating blades are diagonal relative to the rotating shaft as viewed in the direction of the axis, and the group includes feeding blades and retrieving blades of which the phases shift by 180° so that the planes of the blades cross each other.

* * * * *